Dec. 12, 1967    F. W. W. MORLEY ETAL    3,357,757
TURBINE BEARING ASSEMBLY
Filed Jan. 11, 1965

United States Patent Office 3,357,757
Patented Dec. 12, 1967

3,357,757
TURBINE BEARING ASSEMBLY
Frederick William Walton Morley, Castle Donington, and Stanley Cooper, Littleover, Derby, England, assignors to Rolls-Royce Limited, Derby, England, a company of Great Britain
Filed Jan. 11, 1965, Ser. No. 424,742
Claims priority, application Great Britain, Feb. 21, 1964, 7,467/64, Patent 988,500
5 Claims. (Cl. 308—26)

This invention concerns bearings and, although not so restricted it will, hereinafter, be described with reference to its use on gas turbine engines.

According to the present invention, there is provided a bearing at least one portion of which is resiliently connected to fixed structure by a plurality of angularly spaced apart, axially extending resilient bars, said fixed structure defining with said one portion, or with a member connected to said one portion, a relatively narrow gap adapted to receive fluid to provide damping between said fixed structure and said one portion.

Preferably the bearing comprises rolling elements in contact with inner and outer races, one of said races constituting said one portion.

The race may have axially spaced edges, one edge of said one race being connected to said fixed structure by said bars, the other edge of said one race being connected to a member having, or being provided with surfaces, said surfaces defining with further surfaces provided on said fixed structure, an annular gap which is adapted to receive fluid to provide radial damping between said fixed structure and said one race of said bearing. A conduit preferably communicates with said gap to supply oil thereto under pressure.

The one portion of the bearing may be provided with an abutment which is radially spaced from a further abutment provided on said fixed structure, said abutments being arranged to abut one another to limit relative radial movement between said bearing and said fixed structure. Preferably said abutment forms part of an annular abutment member fixed to said one portion, and said further abutment forms part of a further annular abutment member fixed to said fixed structure.

The one race may be the outer race of the bearing.

The invention also includes a gas turbine engine having shafting on which is mounted a compressor and a turbine of the engine, said shafting being journalled within a bearing as set forth above.

Figure 1:
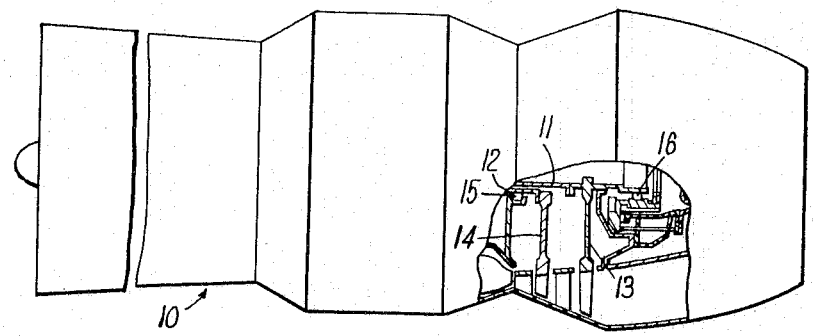
Figure 2:
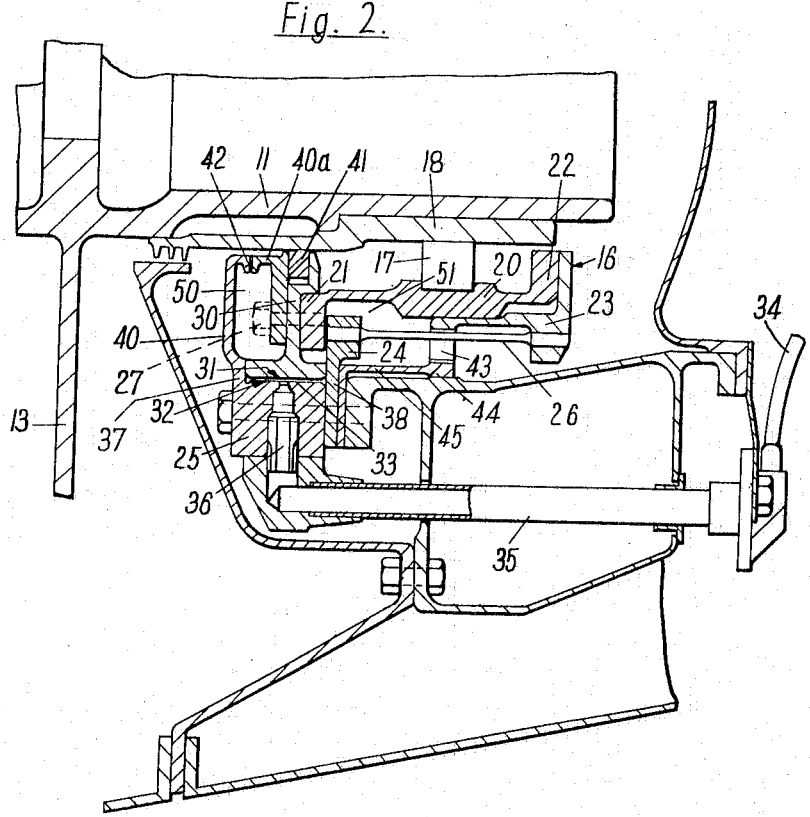

The invention is illustrated, merely by way of example, in the accompanying drawings, in which:

FIGURE 1 is a cut-away view of a gas turbine engine provided with a bearing according to the present invention, and FIGURE 2 is a view of part of the engine of FIGURE 1 to a larger scale.

Referring to the drawings, a gas turbine engine 10 has shafts 11 and 12 on which are mounted turbine discs 13 and 14 and compressors (not shown). Turbine blades are mounted on turbine discs 13 and 14. Shaft 12 is journalled within a bearing 15 and shaft 11 is journalled within a bearing 16.

As seen more clearly in FIGURE 2, the bearing 16 comprises rollers 17 which are disposed in rolling contact with an inner race 18 and an outer race 20. The inner race 18 is mounted around the shaft 11. The outer race 20 has axially spaced edges 21, 22, the edge 22 being attached to an annular member 23 which itself is resiliently connected to an annular member 24 (which is fixed to fixed structure 25) by a plurality of angularly spaced apart, axially extending, resilient bars 26. Thus the edge 22 of the outer race 20 is resiliently connected to fixed structure 25 by the resilient bars 26.

The other edge 21 of the outer race 20 is attached, by set screws 27 to an annular T member 30. The member 30 is provided with a cylindrical surface 31 which is spaced from a cylindrical surface 32 provided on fixed structure 25, to define therewith an annular gap 33. The surface 32 is flanked by two radially extending annular walls 37, 38 which are extensions of fixed structure 25 and annular member 24, respectively. The surface 31 is flanked by two radially extending annular walls forming sides of the axially disposed element of the T member 30. The radial walls of the fixed structure and the radial walls of the T member cooperate to enclose said gap. Oil is supplied, under pressure, from a flexible pipe 34, conduit 35 and drilling 36 in fixed structure 25 to the annular gap 33. The oil may then flow from annular gap 33 into a chamber 50 defined by an extension 40 and into a chamber 51. Annular wall 37 forms part of the extension 40, whilst a further annular member 40a is connected, by set screws 27, to T member 30. Disposed between member 40a and T member 30 is a metal sealing ring 41 which bears against the inner race 18. An annular gap 42 is provided between extension 40 and member 40a to permit relative axial movement therebetween.

Annular member 23 terminates, at its radially outer end, in an annular abutment 43. Abutment 43 is radially spaced from a further annular abutment 44 which is formed of an annular member 45, also attached to fixed structure 25.

Should the shaft 11 become unbalanced, and subjected to rotating load, the resulting motion to which the bearing 16 will be subjected, and the attitude in which the unbalanced shaft will rotate in the bearing 16, will be modified by the resilient mounting bars 26 in conjunction with the fluid film within annular gap 33. Thus the dynamic load transmitted to the structure will be attenuated relative to the load which would be transmitted if the support bearing 20 were mounted rigidly in the structure.

Should vibration and radial movement of the bearing 16, including outer race 20, become excessive, this will be limited by abutments 43 and 44 contacting one another. These abutments contacting will thus serve to reduce the danger of bars 26 breaking in the event of severe unbalance resulting, for example, from turbine blade failure. Also, of course, the abutments are a safeguard against serious engine failure resulting from failure of the bars 26.

It is not desirable that abutments 43, 44 should come into contact in any condition other than that arising in an emergency, and the "squeeze film" damping provided by the film of oil within annular gap 33 prevents contact between abutments 43, 44 except in an emergency. Orbiting of the bearing 16 relative to the fixed structure will be controlled by fluid film within annular gap 33 so as to prevent contacting between abutments 43 and 44 during resonance under predictable unbalance. However, should the relative radial movement become excessive, and the film of oil is unable to damp the movement, abutments 43 and 44 will come into contact to limit the movement.

Instead of maintaining a constant flow of oil through conduit 35, drilling 36 and annular gap 33, the oil could simply be maintained at a constant pressure in the gap 33 to provide the damping film.

Although, as shown in the drawings, the annular gap 33 is axially spaced from the rollers 17, a preferable arrangement can be obtained by disposing the annular gap 33 and the rollers 17 at the same axial position. In this manner, the vibrations of the bearing will be transmitted direct to the thin oil film, and no leverage will be introduced by the axial distance between the members.

We claim:
1. A bearing assembly comprising fixed structure, a bearing supported therein, a plurality of angularly spaced apart, axially extending resilient bars resiliently connecting one portion of said bearing to said fixed structure, said fixed structure and said one portion having respective cylindrical surfaces defining a relatively narrow continuous annular gap therebetween, radially extending surfaces of said fixed structure and said one portion cooperating to completely enclose said gap, and means for supplying lubricant under pressure to said gap whereby in operation a hydrodynamic film of lubricant is maintained in said gap to provide damping between said fixed structure and said one portion of the bearing.

2. A bearing assembly as claimed in claim 1 and further comprising an abutment provided on said one portion, and a further abutment provided on said fixed structure, said abutments being radially spaced apart and being arranged to abut one another to limit relative radial movement between said bearing and said fixed structure.

3. A bearing assembly as claimed in claim 2 in which said abutment members are annular.

4. A bearing assembly as claimed in claim 1 comprising an inner race, an outer race, and rolling elements in contact with said inner and outer races, said one portion of the bearing comprising one of said races, said resilient bars resiliently connecting said one race to the fixed structure, and said one race and said fixed structure having thereon respective said cylindrical surfaces defining said annular gap therebetween.

5. A bearing assembly as claimed in claim 4 in which said one race has axially spaced edges, and in which the resilient bars resiliently connect one edge of said one race to the fixed structure and a member is connected to the other edge of said one race, one of said cylindrical surfaces being provided on said member.

References Cited

UNITED STATES PATENTS

| | | | |
|---|---|---|---|
| 2,698,772 | 1/1955 | Roberts | 308—184 |
| 2,729,518 | 1/1956 | O'Connor | 308—26 |
| 3,005,668 | 10/1961 | Szydlowski | 308—184 |
| 3,205,024 | 9/1965 | Morley et al. | 308—184 |

FOREIGN PATENTS 928,250  6/1963  Great Britain.

MARTIN P. SCHWADRON, *Primary Examiner.*

R. F. HESS, *Assistant Examiner.*